US012608846B2

(12) United States Patent
Cho et al.

(10) Patent No.: US 12,608,846 B2
(45) Date of Patent: Apr. 21, 2026

(54) METHOD AND APPARATUS FOR TRAINING GENERATIVE MODEL FOR 3D CONSISTENT MEDICAL VOLUME DATA

(71) Applicant: GENGENAI, INC, Seoul (KR)

(72) Inventors: Hojin Cho, Seoul (KR); Sangil Kim, Seoul (KR)

(73) Assignee: GENGENAI, INC, Seoul (KR)

( * ) Notice: Subject to any disclaimer, the term of this patent is extended or adjusted under 35 U.S.C. 154(b) by 307 days.

(21) Appl. No.: 18/213,471

(22) Filed: Jun. 23, 2023

(65) Prior Publication Data

US 2024/0303872 A1      Sep. 12, 2024

(30) Foreign Application Priority Data

Mar. 6, 2023      (KR) ........................ 10-2023-0029219

(51) Int. Cl.
  *G06T 11/00*      (2006.01)
  *G06T 7/00*      (2017.01)
  *G06T 17/10*      (2006.01)

(52) U.S. Cl.
  CPC ............ *G06T 11/00* (2013.01); *G06T 7/0012* (2013.01); *G06T 17/10* (2013.01); *G06T 2207/20081* (2013.01); *G06T 2207/20084* (2013.01)

(58) Field of Classification Search
  None
  See application file for complete search history.

(56) References Cited

U.S. PATENT DOCUMENTS 10,824,914 B2 * 11/2020 Yoo ........................ G06F 18/214
2020/0090328 A1   3/2020 Takei et al.

2020/0364477 A1 * 11/2020 Rahman Siddiquee .....................
                                              G06V 10/7753
2023/0030088 A1 *  2/2023 Afrasiabi ................. G06N 3/02
2023/0083935 A1 *  3/2023 Lu .......................... A61B 6/032
                                                        382/131
2025/0272849 A1 *  8/2025 Wu .......................... G06T 7/13

FOREIGN PATENT DOCUMENTS

| JP | 2020-043927 A | 3/2020 |
| KR | 10-2020-0118050 A | 10/2020 |
| KR | 10-2021-0135039 A | 11/2021 |
| WO | 2019/138001 A1 | 7/2019 |

OTHER PUBLICATIONS

MedGen3D: A Deep Generative Framework for Paired 3D Image and Mask Generation Kun Han1, Yifeng Xiong1 (Year: 2022).*
Aug. 21, 2024—(EP) European Search Report—App No. 24161071.6.
Zeng et al: "Hybrid Generative Adversarial Networks for Deep MR to CT Synthesis Using Unpaired Data", Oct. 10, 2019 (Oct. 10, 2019), Oct. 10, 2019, pp. 759-767, XP047522866, [retrieved on Oct. 10, 2019].

* cited by examiner

*Primary Examiner* — Nancy Bitar
(74) *Attorney, Agent, or Firm* — Banner & Witcoff, Ltd.

(57)      ABSTRACT

A method for training a 3D space consistent medical volume data generative model is provided, which is performed by one or more processors and which includes generating a synthetic volume data using a generator network, receiving real volume data, generating a plurality of 2D images based on the synthetic volume data and the real volume data, discriminating whether each of the plurality of generated 2D images is real or fake by using a plurality of discriminator networks, and updating the generator network based on discrimination results of the plurality of discriminator networks.

20 Claims, 10 Drawing Sheets

REAL VOLUME DATA 122

110

GENERATOR
NETWORK

SYNTHETIC
VOLUME DATA 112

120

2D IMAGE
GENERATOR

2D SYNTHETIC
SLICE IMAGE 124

2D REAL SLICE IMAGE
126

130

DISCRIMINATION
RESULT
DGENERATOR

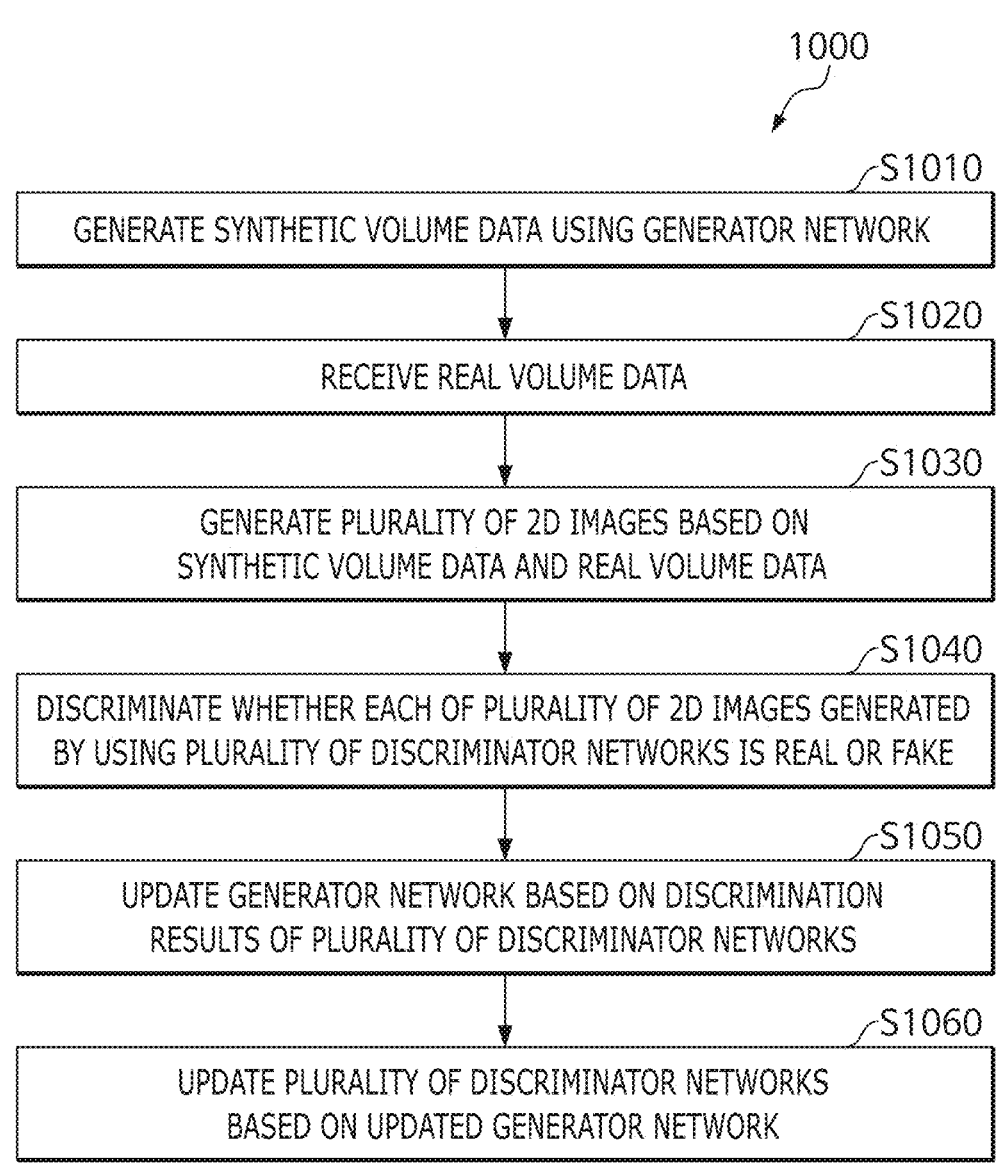

1000

S1010
GENERATE SYNTHETIC VOLUME DATA USING GENERATOR NETWORK

S1020
RECEIVE REAL VOLUME DATA

S1030
GENERATE PLURALITY OF 2D IMAGES BASED ON
SYNTHETIC VOLUME DATA AND REAL VOLUME DATA

S1040
DISCRIMINATE WHETHER EACH OF PLURALITY OF 2D IMAGES GENERATED
BY USING PLURALITY OF DISCRIMINATOR NETWORKS IS REAL OR FAKE

S1050
UPDATE GENERATOR NETWORK BASED ON DISCRIMINATION
RESULTS OF PLURALITY OF DISCRIMINATOR NETWORKS

S1060
UPDATE PLURALITY OF DISCRIMINATOR NETWORKS
BASED ON UPDATED GENERATOR NETWORK

FIG. 10

METHOD AND APPARATUS FOR TRAINING GENERATIVE MODEL FOR 3D CONSISTENT MEDICAL VOLUME DATA

CROSS-REFERENCE TO RELATED APPLICATION

This application claims priority under 35 U.S.C. § 119 to Korean Patent Application No. 10-2023-0029219, filed in the Korean Intellectual Property Office on Mar. 6, 2023, the entire contents of which are hereby incorporated by reference.

BACKGROUND

Technical Field

The present disclosure relates to a method and apparatus for training a 3D space consistent medical volume data generative model, and more particularly, to a method and system for training a medical volume data generative model having a plurality of discriminator networks.

Description of the Related Art

In recent years, deep learning technology has made significant achievements in various application fields, including computer vision, natural language processing, etc., and is recognized as a key technology leading to rapid development. The deep learning technology is also being used in the medical field, and in particular, various studies are conducted in medical image analysis using the deep learning technology.

Meanwhile, in order to effectively utilize the deep learning technology, a large amount of training data for various cases is required. However, there is a problem in that it is difficult to acquire medical image training data for various reasons such as high cost, privacy protection, data labeling problems, etc.

In order to overcome the problems described above, technologies for supplementing training data by generating medical image data through AI technology are developed. However, when the generated medical image data is reconstructed into 3D data, there is a problem in that, unlike real data, consistency is not maintained and distortion occurs in the 3D space.

SUMMARY

In order to solve the problems described above, the present disclosure provides a method and apparatus (system) for training a medical volume data generative model having a plurality of discriminator networks.

The present disclosure may be implemented in a variety of ways, including a method, an apparatus (system), or a non-transitory computer-readable recording medium storing instructions.

A method for training a 3D space consistent medical volume data generative model is provided, which may be performed by one or more processors and include generating synthetic volume data using a generator network, receiving real volume data, generating a plurality of 2D images based on the synthetic volume data and the real volume data, discriminating whether each of the plurality of generated 2D images is real or fake by using plurality of discriminator networks, and updating the generator network based on discrimination results of the plurality of discriminator networks.

The generating the plurality of 2D images may include generating a plurality of 2D synthetic slice images based on the synthetic volume data, and generating a plurality of 2D real slice images based on the real volume data, in which the plurality of 2D synthetic slice images and the plurality of 2D real slice images may be generated at the same location in each volume data.

The generating the plurality of 2D images may include generating a first set of 2D synthetic slice images by projecting the synthetic volume data in coronal planes, generating a second set of 2D synthetic slice images by projecting the synthetic volume data in sagittal planes, generating a third set of 2D synthetic slice images by projecting the synthetic volume data in axial planes, generating a first set of 2D real slice images by projecting the real volume data in the coronal planes, generating a second set of 2D real slice images by projecting the real volume data in the sagittal planes, and generating a third set of 2D real slice images by projecting the real volume data in the axial planes.

The plurality of discriminator networks may include a first discriminator network, a second discriminator network, and a third discriminator network, the first discriminator network may discriminate whether the 2D images projected in the coronal planes are real or fake, the second discriminator network may discriminate whether the 2D images projected in the sagittal planes are real or fake, and the third discriminator network may discriminate whether the 2D images projected in the axial planes are real or fake.

The plurality of discriminator networks may include a first discriminator network and a second discriminator network, in which the first discriminator network may discriminate whether 2D images parallel to first planes are real or fake, the second discriminator network may discriminate whether 2D images parallel to second planes are real or fake, and the first surface and the second surface may be orthogonal to each other.

The generator network may be configured to generate a single 2D slice image, generate a 2D slice image sequence, or generate synthetic volume data, and when the generator network is configured to generate the single 2D slice image, the synthetic volume data may be generated by merging the 2D slice images generated by the generator network.

The method may further include updating the plurality of discriminator networks based on the updated generator network.

A computer program stored in a computer-readable recording medium may be provided to execute the method on a computer.

An apparatus is provided, which may include a memory; and one or more processors connected to the memory and configured to execute one or more computer-readable programs included in the memory, in which the one or more programs may include instructions for generating synthetic volume data using a generator network, receiving real volume data, generating a plurality of 2D images based on the synthetic volume data and the real volume data, discriminating whether each of the plurality of generated 2D images is real or fake by using a plurality of discriminator networks, and updating the generator network based on discrimination results of the plurality of discriminator networks.

A system for generating medical volume data may be provided, which may include a generator network configured to generate synthetic volume data, a 2D image generator configured to receive real volume data and the synthetic volume data, and generate a plurality of 2D images based on the synthetic volume data and the real volume data, and a plurality of discriminator networks configured to discriminate whether each of the plurality of 2D images is real or fake.

According to various examples of the present disclosure, by discriminating, using the discriminator network, the synthetic volume data generated using the generator network, and updating the generator network through the discrimination result, it is possible to obtain a generative model that generates useful medical volume data related to the deep learning technology in the medical imaging domain.

According to various examples of the present disclosure, by generating a plurality of 2D images by projecting the synthetic volume data at various angles and updating the generator network based on discrimination results as to whether the plurality of 2D images discriminated by the plurality of discriminator networks are real or fake, it is possible to train a generative model to generate undistorted and consistent medical volume data.

According to various examples of the present disclosure, by updating a plurality of discriminator networks based on the updated generator network, it is possible to generate more sophisticated discrimination results for the plurality of generated 2D images. In addition, it is possible to improve the performance of the generator network based on the discrimination result.

According to various examples of the present disclosure, 3D space consistent medical volume data can be generated by using multi-viewpoint discriminator networks.

According to various examples of the present disclosure, by generating a plurality of 2D slice images by projecting the synthetic volume data from various angles and viewpoints, and updating the generator network, discriminator network, etc. based on the discrimination result as to whether the plurality of 2D slice images discriminated by the plurality of discriminator networks corresponding to each angle and viewpoint are real or fake, it is possible to train a generative model to generate undistorted and consistent medical volume data.

According to various examples of the present disclosure, by repeating the process of alternately updating the generator network and the plurality of discriminator networks, the performance of the medical volume data generative model and system can be improved.

The effects of the present disclosure are not limited to the effects described above, and other effects not described herein can be clearly understood by those of ordinary skill in the art (referred to as "ordinary technician") from the description of the claims.

BRIEF DESCRIPTION OF THE DRAWINGS

The above and other objects, features and advantages of the present disclosure will be described with reference to the accompanying drawings described below, where similar reference numerals indicate similar elements, but not limited thereto.

FIG. 10 is a flowchart illustrating an example of a method for training a medical image generative model.

DETAILED DESCRIPTION

Figure 1:
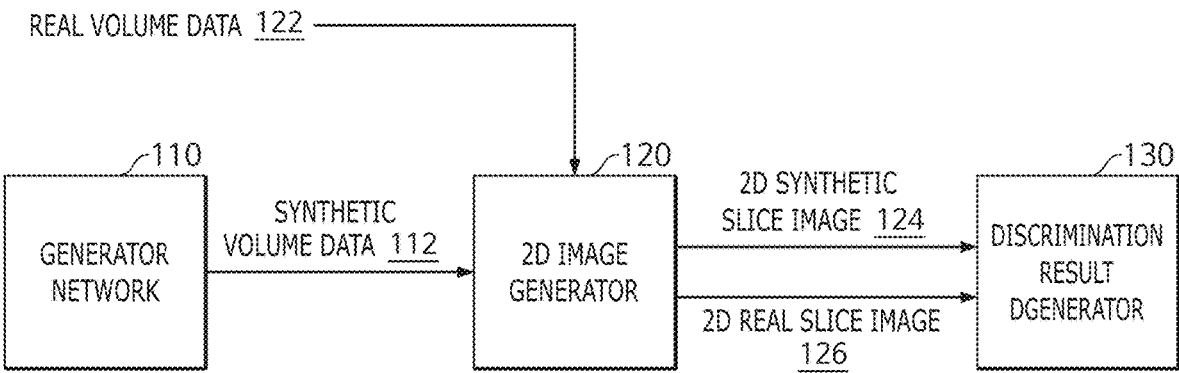
FIG. 1 illustrates an example of a method for training a medical volume data generative model.

Hereinafter, example details for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any example.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

The terms used herein will be briefly described prior to describing the disclosed example(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, in which case the meaning of the terms will be described in detail in a corresponding description of the example(s). Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly displays the singular forms. Further, the plural forms are intended to include the singular forms as well, unless the context clearly indicates the plural forms. Further, throughout the description, when a portion is stated as "comprising (including)" a component, it is intended as meaning that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

The "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), etc. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. The memory is said to be in electronic communication with a processor if the processor can read information from and/or write information to the memory. The memory integrated with the processor is in electronic communication with the processor.

In the present disclosure, a "system" may refer to at least one of a server device and a cloud device, but not limited thereto. For example, the system may include one or more server devices. In another example, the system may include one or more cloud devices. In still another example, the system may include both the server device and the cloud device operated in conjunction with each other.

In the present disclosure, "medical volume data" may refer to 3D volume data utilized in the medical field. For example, the medical volume data may include 3D scan data (e.g., CT images, MRI images, etc.) of body or organs of a human.

FIG. 1 illustrates an example of a method for training a medical volume data generative model. As illustrated in FIG. 1, the medical volume data generative model and system may include a generator network 110, a 2D image generator 120, and a discrimination result generator 130, and may use a generative adversarial network (GAN) model architecture. For example, VanillaGAN, BigGAN, StyleGAN model architectures, etc. may be used. The generator network 110 for generating virtual data may generate virtual data, and the discrimination result generator 130 may discriminate whether the data is real or fake.

The generator network 110 may generate synthetic volume data 112 and transmit the generated data to the 2D image generator 120. The synthetic volume data 112 may be a merge of 2D slice images, a 2D slice image sequence, or 3D volume data. The generator network 110 for generating such synthetic volume data may be configured to generate single 2D slice images and merge the images, generate 2D slice image sequences, or generate 3D synthetic volume data.

The 2D image generator 120 may generate a plurality of 2D images 124 and 126 from the synthetic volume data 112. For example, the 2D image generator 120 may generate a plurality of 2D synthetic slice images 124 based on the synthetic volume data 112, and generate a plurality of 2D real slice images 126 based on real volume data 122. In this case, the plurality of 2D synthetic slice images 124 and the plurality of 2D real slice images 126 may be generated at the same location in each volume data. This will be described below with reference to FIG. 5.

The discrimination result generator 130 may discriminate whether each of the plurality of generated 2D images 124 and 126 is real or fake. To this end, the discrimination result generator 130 may be configured to include a plurality of discriminator networks that discriminate whether each of the plurality of 2D images 124 and 126 is real or fake. This will be described below with reference to FIGS. 7 and 8.

The training unit (not illustrated) may update the generator network 110 based on the discrimination result generated by the discrimination result generator 130. In addition, the training unit (not illustrated) may update the plurality of discriminator networks of the discrimination result generator 130 based on the updated generator network 110. This will be described below with reference to FIG. 9.

With the configuration described above, it is possible to obtain a generative model that generates 3D space consistent medical volume data usable in the medical imaging domain.

Figure 2:
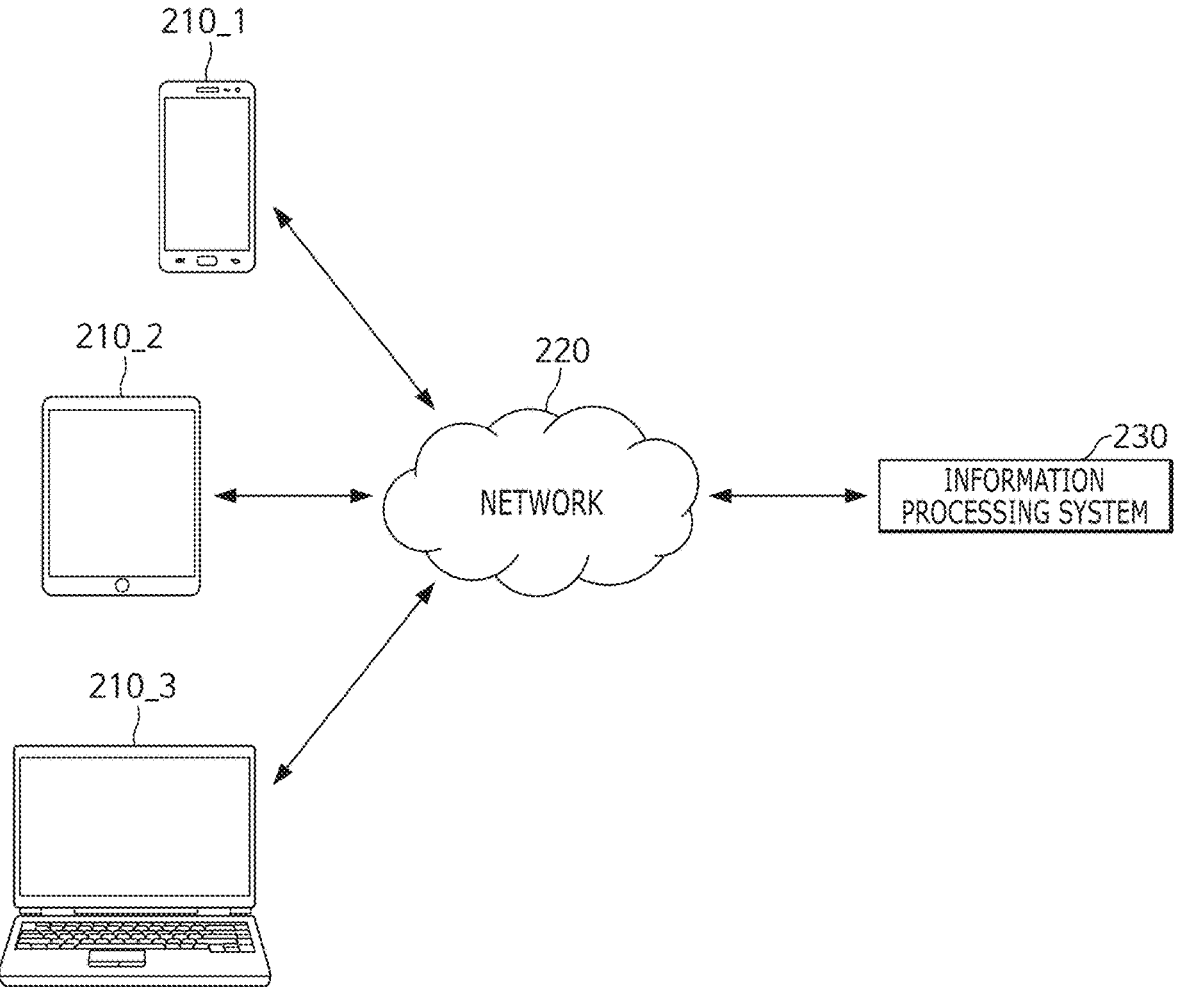
FIG. 2 is a schematic diagram illustrating a configuration in which an information processing system is communicatively connected with a plurality of user terminals to provide a trained medical volume data generative model and/or generated medical volume data.

FIG. 2 schematically illustrates a configuration in which an information processing system 230 is communicatively connected to a plurality of user terminals 210_1, 210_2, and 210_3 to provide a trained medical volume data generative model, generated medical volume data, etc. As illustrated, the plurality of user terminals 210_1, 210_2, and 210_3 may be connected through a network 220 to the information processing system 230 which can provide a medical volume data generative model, medical volume data, etc. The plurality of user terminals 210_1, 210_2, and 210_3 may include user terminals that receives medical volume data generative models, medical volume data, etc.

The information processing system 230 may include one or more server devices and/or databases, or one or more distributed computing devices and/or distributed databases based on cloud computing services that can store, provide and execute computer-executable programs (e.g., downloadable applications) and data associated with the provision of medical volume data generative model, medical volume data, etc.

The medical volume data generative model, the medical volume data, etc. provided by the information processing system 230 may be provided to the user through a medical volume data generative model, an application web browser or web browser extension program related to the medical volume data, etc. of each of the plurality of user terminals 210_1, 210_2, and 210_3. For example, the information processing system 230 may provide corresponding information or perform a corresponding process according to a request to provide the medical volume data generative model, a request to generate medical volume data, etc. received from the user terminals 210_1, 210_2, and 210_3 through an application related to medical volume data generative models, an application related to medical volume data, etc.

The plurality of user terminals 210_1, 210_2, and 210_3 may communicate with the information processing system 230 through the network 220. The network 220 may be configured to enable communication between the plurality of user terminals 210_1, 210_2, and 210_3 and the information processing system 230. The network 220 may be configured as a wired network such as Ethernet, a wired home network (Power Line Communication), a telephone line communication device and RS-serial communication, a wireless network such as a mobile communication network, a wireless LAN (WLAN), Wi-Fi, Bluetooth, and ZigBee, or a combination thereof, depending on the installation environment. The method of communication may include a communication method using a communication network (e.g., mobile communication network, wired Internet, wireless Internet, broadcasting network, satellite network, etc.) that may be included in the network 220 as well as short-range wireless communication between the user terminals 210_1, 210_2, and 210_3, but aspects are not limited thereto.

In FIG. 2, a mobile phone terminal 210_1, a tablet terminal 210_2, and a PC terminal 210_3 are illustrated as the examples of the user terminals, but aspects are not limited thereto, and the user terminals 210_1, 210_2, and 210_3 may be any computing device that is capable of wired and/or wireless communication and capable of installing and executing a medical volume data generative model, an application or web browser related to medical volume data, etc. For example, the user terminal may include an AI speaker, a smart phone, a mobile phone, a navigation, a computer, a notebook, a digital broadcasting terminal, a personal digital assistant (PDA), a portable multimedia player (PMP), a tablet PC, a game console, a wearable device, an internet of things (IoT) device, a virtual reality (VR) device, an augmented reality (AR) device, a set-top box, etc. In addition, while FIG. 2 illustrates that three user terminals 210_1, 210_2, and 210_3 are in communication with the information processing system 230 through the network 220, aspects are not limited thereto, and a different number of user terminals may be configured to be in communication with the information processing system 230 through the network 220.

FIG. 2 illustrates an example where the user terminals 210_1, 210_2, and 210_3 receive a medical volume data generative model, medical volume data, etc. from the information processing system 230, but aspects are not limited thereto. For example, the medical volume data generative model, the medical volume data, etc. may not be provided through the communication with the information processing system 230, but through a program, an application, etc. relating to the medical volume data generative model, the medical volume data, etc., installed in the user terminals 210_1, 210_2, and 210_3.

Figure 3:
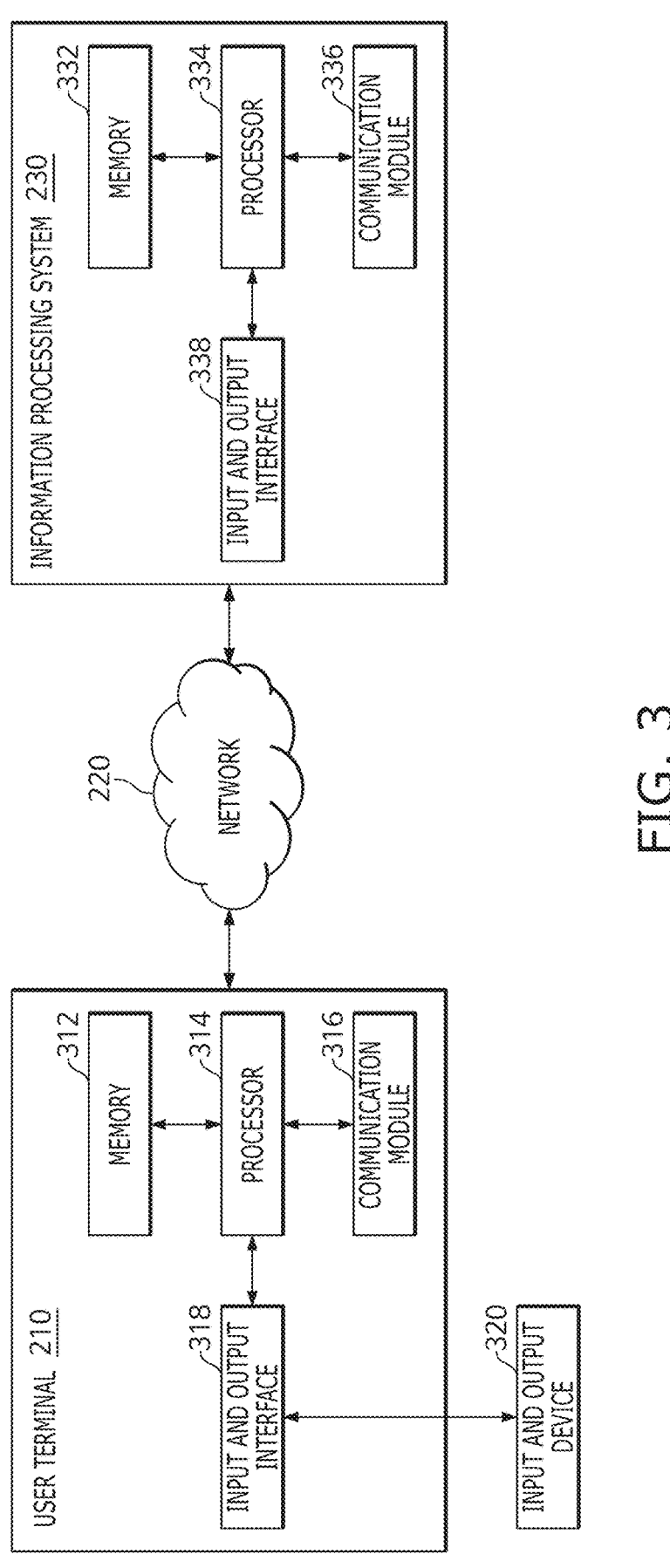
FIG. 3 is a block diagram of an internal configuration of the user terminal and the information processing system.

FIG. 3 is a block diagram of an internal configuration of a user terminal 210 and the information processing system 230. The user terminal 210 may refer to any computing device that is capable of executing the application, web browser, etc. and also capable of wired/wireless communication, and may include the mobile phone terminal 2101, the tablet terminal 210_2, and the PC terminal 210_3 of FIG. 2, for example. As illustrated, the user terminal 210 may include a memory 312, a processor 314, a communication module 316, and an input and output interface 318. Likewise, the information processing system 230 may include a memory 332, a processor 334, a communication module 336, and an input and output interface 338. As illustrated in FIG. 3, the user terminal 210 and the information processing system 230 may be configured to communicate information, data, etc. through the network 220 using respective communication modules 316 and 336. In addition, an input and output device 320 may be configured to input information, data, etc. to the user terminal 210, or output information, data, etc. generated from the user terminal 210 through the input and output interface 318.

The memories 312 and 332 may include any non-transitory computer-readable recording medium. The memories 312 and 332 may include a permanent mass storage device such as read only memory (ROM), disk drive, solid state drive (SSD), flash memory, etc. As another example, a non-destructive mass storage device such as ROM, SSD, flash memory, disk drive, etc. may be included in the user terminal 210 or the information processing system 230 as a separate permanent storage device that is distinct from the memory. In addition, an operating system and at least one program code may be stored in the memories 312 and 332.

These software components may be loaded from a computer-readable recording medium separate from the memories 312 and 332. Such a separate computer-readable recording medium may include a recording medium directly connectable to the user terminal 210 and the information processing system 230, and may include a computer-readable recording medium such as a floppy drive, a disk, a tape, a DVD/CD-ROM drive, a memory card, etc., for example. As another example, the software components may be loaded into the memories 312 and 332 through the communication modules 316 and 336 rather than the computer-readable recording medium. For example, at least one program may be loaded into the memories 312 and 332 based on a computer program installed by files provided by developers or a file distribution system that distributes an installation file of an application via the network 220.

The processors 314 and 334 may be configured to process the instructions of the computer program by performing basic arithmetic, logic, and input and output operations. The instructions may be provided to the processors 314 and 334 from the memories 312 and 332 or the communication modules 316 and 336. For example, the processors 314 and 334 may be configured to execute the received instructions according to a program code stored in a recording device such as the memories 312 and 332.

The communication modules 316 and 336 may provide a configuration or function for the user terminal 210 and the information processing system 230 to communicate with each other through the network 220, and may provide a configuration or function for the user terminal 210, the information processing system 230, etc. to communicate with another user terminal or another system (e.g., a separate cloud system, etc.). For example, a request or data (e.g., a request to provide a medical volume data generative model, a request to generate medical volume data, etc.) generated by the processor 314 of the user terminal 210 according to the program code stored in the recording device such as the memory 312, etc. may be transmitted to the information processing system 230 through the network 220 under the control of the communication module 316. Conversely, a control signal or command provided under the control of the processor 334 of the information processing system 230 may be received by the user terminal 210 through the communication module 316 of the user terminal 210 through the communication module 336 and the network 220.

The input and output interface 318 may be a means for interfacing with the input and output device 320. As an example, the input device may include a device such as a camera including an audio sensor and/or an image sensor, a keyboard, a microphone, a mouse, etc., and the output device may include a device such as a display, a speaker, a haptic feedback device, etc. As another example, the input and output interface 318 may be a means for interfacing with a device such as a touch screen, etc. that integrates a configuration or function for performing inputting and outputting. For example, when the processor 314 of the user terminal 210 processes the instructions of the computer program loaded into the memory 312, a service screen, etc., which is configured with the information, data, etc. provided by the information processing system 230 or another user terminals, may be displayed on the display via the input and output interface 318. While FIG. 3 illustrates that the input and output device 320 is not included in the user terminal 210, aspects are not limited thereto, and an input and output device may be configured as one device with the user terminal 210. In addition, the input and output interface 338 of the information processing system 230 may be a means for interfacing with a device (not illustrated) for inputting or outputting that may be connected to, or included in the information processing system 230. While FIG. 3 illustrates the input and output interfaces 318 and 338 as the components configured separately from the processors 314 and 334, aspects are not limited thereto, and the input and output interfaces 318 and 338 may be configured to be included in the processors 314 and 334.

The user terminal 210 and the information processing system 230 may include more than those components illustrated in FIG. 3. Meanwhile, most of the related components may not necessarily require exact illustration. The user terminal 210 may be implemented to include at least a part of the input and output device 320 described above. In addition, the user terminal 210 may further include other components such as a transceiver, a Global Positioning System (GPS) module, a camera, various sensors, a database, etc. For example, if the user terminal 210 is a smartphone, it may generally include components included in the smartphone, and for example, it may be implemented such that various components such as an acceleration sensor, a gyro sensor, a microphone module, a camera module, various physical buttons, buttons using a touch panel, input and output ports, a vibrator for vibration, etc. are further included in the user terminal 210.

While a program for an application related to a medical volume data generative model, an application related to a medical volume data, etc. is being operated, the processor 314 may receive text, image, video, audio, and/or action, etc. inputted or selected through the input device such as a camera, a microphone, etc., that includes a touch screen, a keyboard, an audio sensor and/or an image sensor connected to the input and output interface 318, and store the received text, image, video, audio, and/or action, etc. in the memory 312, or provide the same to the information processing system 230 through the communication module 316 and the network 220.

The processor 314 of the user terminal 210 may be configured to manage, process and/or store the information, data, etc. received from the input and output device 320, another user terminal, the information processing system 230, a plurality of external systems, etc. The information, data, etc. processed by the processor 314 may be provided to the information processing system 230 via the communication module 316 and the network 220. The processor 314 of the user terminal 210 may transmit the information, data, etc. to the input and output device 320 via the input and output interface 318 to output the same. For example, the processor 314 may display the received information, data, etc. on a screen of the user terminal 210.

The processor 334 of the information processing system 230 may be configured to manage, process, and/or store information, data, etc. received from a plurality of user terminals 210, a plurality of external systems, etc. The information, data, etc. processed by the processor 334 may be provided to the user terminals 210 via the communication module 336 and the network 220.

Figure 4:
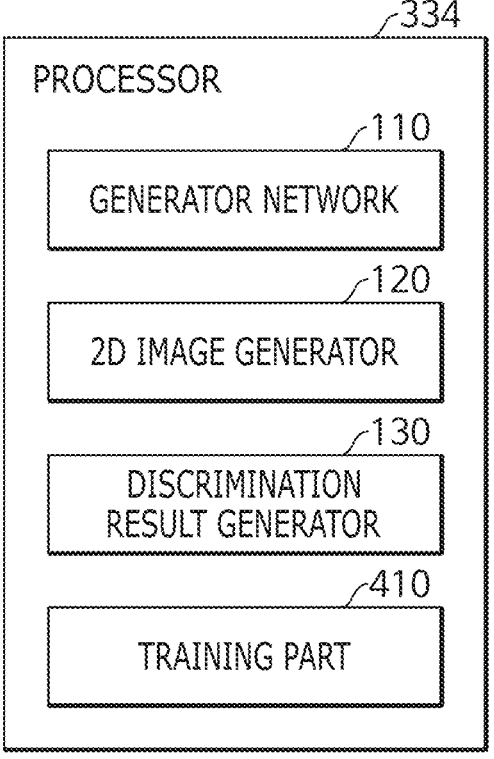
FIG. 4 is a block diagram of an internal configuration of a processor of the information processing system.

FIG. 4 is a block diagram illustrating an internal configuration of the processor 334 of the information processing system and the user terminal. As illustrated in FIG. 4, the processor 334 may include the generator network 110, the 2D image generator 120, the discrimination result generator 130, and a training unit 410. The respective components of the processor 334 illustrated in FIG. 4 represent functional components that can be divided on the basis of functions, and in an actual physical environment, a plurality of components may be implemented as being incorporated with each other. Alternatively, the respective components of the processor 334 may be implemented separately from each other in the actual physical environment. In addition, although the internal configuration of the processor 334 in FIG. 4 may be implemented such that it is divided into components of the generator network 110, the 2D image generator 120, the discrimination result generator 130, and the training unit 410, aspects are not limited thereto, and some components may be omitted or other components may be added.

The generator network 110 may utilize various structures, models, etc. to generate synthetic volume data. For example, the generator network 110 may be configured to generate a single 2D slice image. In this case, the generator network 110 may merge the generated 2D slice images to generate synthetic volume data. As another example, the generator network 110 may be configured to generate a 2D slice image sequence. In this case, the generator network 110 may utilize Sequential GAN using Bi-LSTM. As another example, the generator network 110 may directly generate 3D synthetic volume data. In this case, the generator network 110 may utilize 3D GAN.

The generator network 110 may receive random noise to generate synthetic volume data.

For example, the generator network 110 that generates the 2D slice image sequence may receive noise for the entire synthetic volume data and noise for each 2D slice image forming the image sequence.

The 2D image generator 120 may generate a plurality of 2D images from real volume data and synthetic volume data generated by the generator network 110. For example, the 2D image generator 120 may generate a plurality of 2D synthetic slice images based on the synthetic volume data. In addition, the 2D image generator 120 may generate a plurality of 2D real slice images based on the real volume data. In this case, the plurality of 2D synthetic slice images and the plurality of 2D real slice images may be images generated at the same location in each volume data. Specifically, the 2D image generator 120 may be configured to generate a plurality of 2D images parallel to planes orthogonal to each other using the synthetic volume data and the real volume data. For example, the 2D image generator 120 may include a coronal plane image generator, a sagittal plane image generator, and an axial plane image generator. This will be described in detail below with reference to FIG. 6.

The discrimination result generator 130 may discriminate whether each of the plurality of generated 2D images is real or fake. To this end, the discrimination result generator 130 may be configured to include a plurality of discriminator networks. For example, the discrimination result generator 130 may include first, second and third discriminator networks for discriminating whether each of the three types of 2D images (e.g., sagittal plane image, coronal plane image, and axial plane image) is real or fake. As another example, the discrimination result generator 130 may be configured to include first and second discriminator networks for discriminating whether each of the two types of 2D images (e.g., first side image and second side image) is real or fake.

This will be described in detail below with reference to FIG. 7.

The training unit 410 may update the generator network 110 based on the discrimination result generated by the discrimination result generator 130. For example, the training unit 410 may train the generator network 110 to generate synthetic volume data that the discrimination result generator 130 discriminates to be real. In addition, the training unit 410 may update the plurality of discriminator networks of the discrimination result generator 130 based on the updated generator network. For example, the training unit 410 may cause the discrimination result generator to generate the discrimination result using the synthetic volume data generated from the updated generator network. The plurality of discriminator networks of the discrimination result generator 130 may be updated based on a loss calculated by comparing the generated discrimination result with ground truth data.

Figure 5:
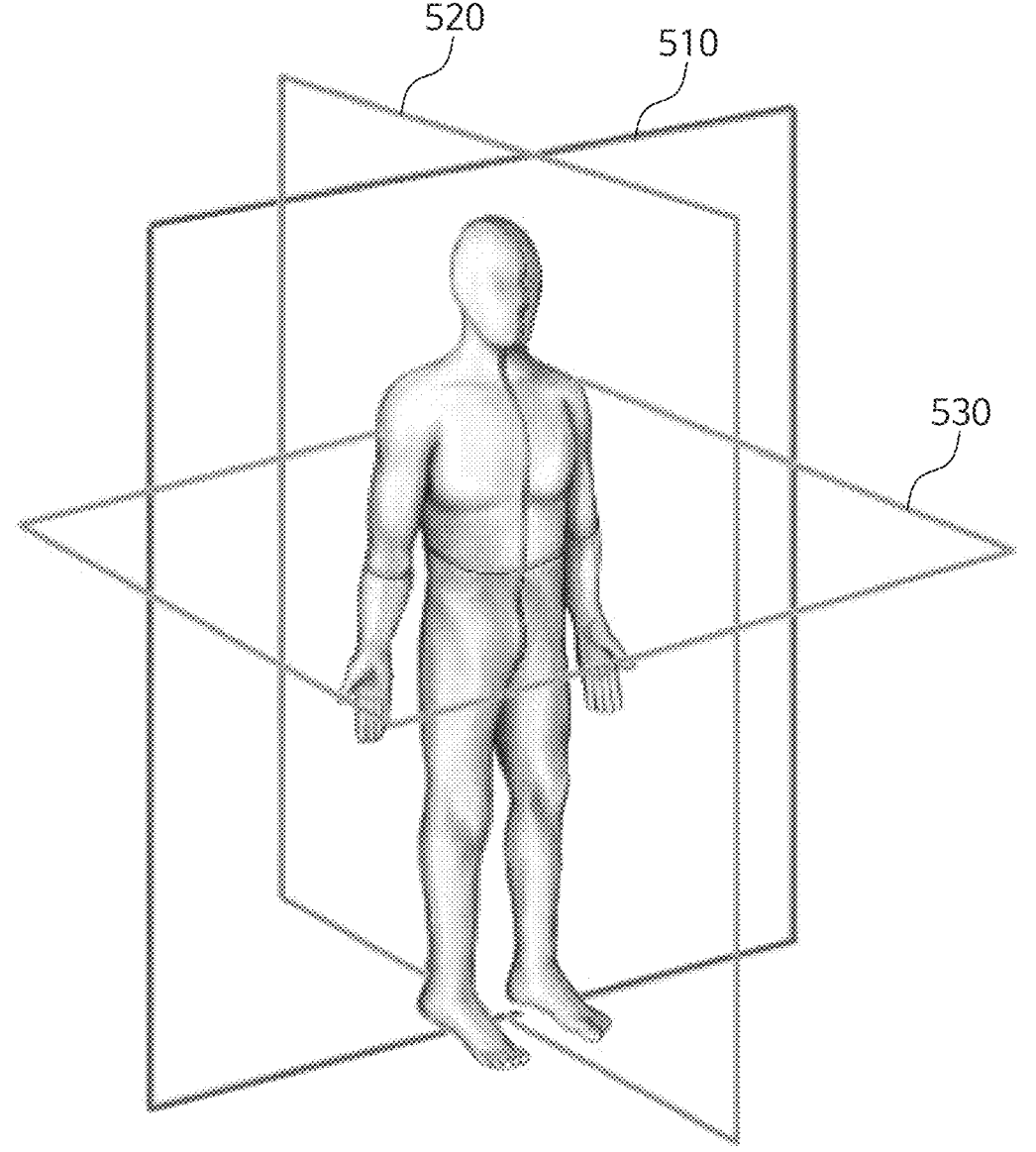
FIG. 5 is a diagram illustrating an example of an anatomical plane related to medical volume data.

FIG. 5 is a diagram illustrating an example of an anatomical plane related to the medical volume data. The anatomical plane may include a coronal plane 510, a sagittal plane 520, and an axial plane 530 as reference standards for describing the structure of the human body. The coronal plane 510, the sagittal plane 520 and the axial plane 530 are planes orthogonal to each other.

The coronal plane 510 may refer to a virtual anatomical plane that divides the human body into a ventral side and a dorsal side. The sagittal plane 520 may refer to a virtual anatomical plane that divides the human body into a left side and a right side, and a plane of the sagittal plane 520, which divides the human body into two halves through the midline may be referred to as a median plane or a mid-sagittal plane. The axial plane 530 may refer to a virtual anatomical plane that divides the human body into upper and lower parts, and the axial plane 530 may refer to a plane perpendicular to the coronal plane 510 and the sagittal plane 520.

These anatomical planes are used to describe the position and orientation of human body structures and play an important role in understanding the relationship between different anatomical parts. In addition, the anatomical aspects described above may be used by the 2D image generator when generating a plurality of 2D images from the medical volume data. This will be described in detail below with reference to FIG. 6.

Figure 6:
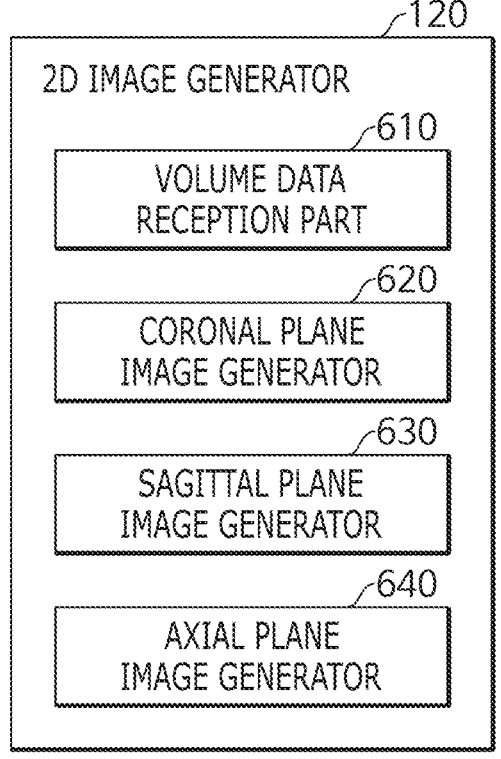
FIG. 6 is a block diagram illustrating an internal configuration of a 2D image generator of the processor.

FIG. 6 is a block diagram illustrating an internal configuration of the 2D image generator 120 of the processor. As illustrated in FIG. 6, the 2D image generator 120 may include a volume data reception unit 610, a coronal plane image generator 620, a sagittal plane image generator 630, and an axial plane image generator 640. The respective components of the 2D image generator 120 illustrated in FIG. 6 represent functional components that can be divided on the basis of functions, and in an actual physical environment, a plurality of components may be implemented as being incorporated with each other. Alternatively, the respective components of the 2D image generator 120 may be implemented separately from each other in the actual physical environment.

The volume data reception unit 610 may receive medical volume data to generate a 2D image from the same. For example, the volume data reception unit 610 may receive synthetic volume data from a generator network. As another example, the volume data reception unit 610 may receive real volume data from a user terminal, an external system, an internal database, etc.

The coronal plane image generator 620 may generate a 2D image by projecting the volume data received by the volume data reception unit in the coronal planes. For example, the coronal plane image generator 620 may generate 2D synthetic slice images by projecting synthetic volume data in the coronal planes. In addition, the coronal plane image generator 620 may generate 2D real slice images by projecting real volume data in the coronal planes.

The coronal plane image generator 620 may generate a 2D image by projecting the volume data received by the volume data reception unit in the coronal planes. For example, the coronal plane image generator 620 may generate a first set of 2D synthetic slice images by projecting synthetic volume data in the coronal planes. In addition, the coronal plane image generator 620 may generate a first set of 2D real slice images by projecting the real volume data in the coronal planes. The coronal plane image generator 620 may project the synthetic volume data and the real volume data in a plane parallel to the coronal planes as well as a plane passing through the center of the human body to generate a first set of 2D synthetic slice images and a first set of 2D real slice images. In addition, the generated first set of 2D synthetic slice images and first set of 2D real slice images may be generated at the same location in each volume data.

The sagittal plane image generator 630 may generate a 2D image by projecting the volume data received by the volume data reception unit in the coronal planes. For example, the sagittal plane image generator 630 may generate a second set of 2D synthetic slice images by projecting synthetic volume data in the sagittal planes. In addition, the sagittal plane image generator 630 may generate a second set of 2D real slice images by projecting the real volume data in the sagittal planes. The sagittal plane image generator 630 may generate a second set of 2D synthetic slice images and a second set of 2D real slice images by projecting the synthetic volume data and the real volume data in a plane parallel to the sagittal planes as well as a plane passing through the center of the human body. In addition, the generated second set of 2D synthetic slice images and second set of 2D real slice images may be generated at the same location in each volume data.

The axial plane image generator 640 may generate a 2D image by projecting the volume data received by the volume data reception unit in the axial planes. For example, the axial plane image generator 640 may generate a third set of 2D synthetic slice images by projecting the synthetic volume data in the axial plane. In addition, the axial plane image generator 640 may generate a third set of 2D real slice images by projecting the real volume data in the axial planes. The axial plane image generator 640 may generate a third set of 2D synthetic slice images and a third set of 2D real slice images by projecting the synthetic volume data and the real volume data in a plane parallel to the axial planes as well as a plane passing through the center of the human body. In addition, the generated third set of 2D synthetic slice images and third set of 2D real slice images may be generated at the same location in each volume data.

In FIG. 6, although the internal configuration of the 2D image generator 120 is implemented such that it is divided into the components of the volume data reception unit 610, the coronal plane image generator 620, the sagittal plane image generator 630, and the axial plane image generator 640, aspects are not limited thereto, and some components may be omitted or other components may be added. For example, the 2D image generator 120 may not include the coronal plane image generator 620, and include only the sagittal plane image generator 630 and the axial plane image generator 640.

Figure 7:
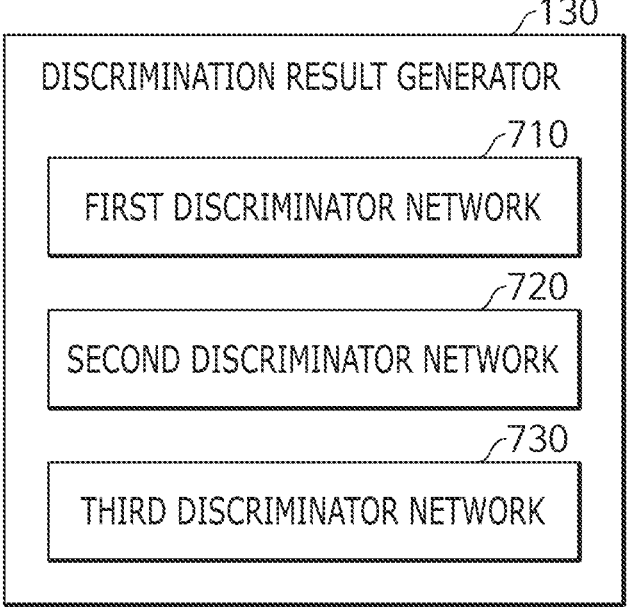
FIG. 7 is a block diagram illustrating an internal configuration of a discrimination result generator of the processor.

FIG. 7 is a block diagram illustrating the internal configuration of the discrimination result generator 130 of the processor. As illustrated in FIG. 7, the discrimination result generator 130 may include a first discriminator network 710, a second discriminator network 720 and a third discriminator network 730. The respective components of the discrimination result generator 130 illustrated in FIG. 7 represent functional components that can be divided on the basis of functions, and in an actual physical environment, a plurality of components may be implemented as being incorporated with each other. Alternatively, the respective components of the discrimination result generator 130 may be implemented separately from each other in the actual physical environment.

The discriminator networks 710, 720, and 730 in the discrimination result generator 130 may be configured as binary classifiers for determining whether a 2D image is real or fake. For example, the discriminator networks 710, 720, and 730 may be trained to output real data (real, 1) as a discrimination result for a 2D real slice image generated from the real volume data, and output synthetic data (fake, 0) as a discrimination result for a 2D synthetic slice image generated from the synthetic volume data. The discriminator networks 710, 720, and 730 may extract features by applying several convolution layers to the received 2D image, and apply a fully connected layer (fc layer) or a multilayer perceptron (MLP) to these features to output a result of discriminating which label (e.g., real data, synthetic data) corresponds to the received 2D image.

The first discriminator network 710 may be configured to discriminate whether the 2D images projected in the coronal planes are real or fake. For example, the first discriminator network 710 may randomly receive the 2D synthetic slice image and the 2D real slice image generated by the coronal plane image generator of the 2D image generator and determine whether each of the images is real or fake.

The second discriminator network 720 may be configured to discriminate whether the 2D images projected in the sagittal planes are real or fake. For example, the second discriminator network 720 may randomly receive the 2D synthetic slice image and the 2D real slice image generated by the sagittal plane image generator of the 2D image generator and determine whether each of the images is real or fake.

The third discriminator network 730 may be configured to discriminate whether the 2D images projected in the axial planes are real or fake. For example, the third discriminator network 730 may randomly receive the 2D synthetic slice image and the 2D real slice image generated by the axial plane image generator of the 2D image generator and determine whether each of the images is real or fake.

In FIG. 7, although the internal configuration of the discrimination result generator 130 is implemented such that it is divided into the first discriminator network 710, the second discriminator network 720, and the third discriminator network 730, aspects are not limited thereto, and some components may be omitted or other components may be added. For example, the discrimination result generator 130 may include only the first discriminator network 710 and the second discriminator network 720. In this case, the first discriminator network 710 may discriminate whether the 2D images parallel to the first planes are real or fake, and the second discriminator network 720 may discriminate whether the 2D images parallel to the second planes orthogonal to the first planes are real or fake.

As described above, 3D space consistent medical volume data may be generated by using multi-viewpoint discriminator networks.

Figure 8:
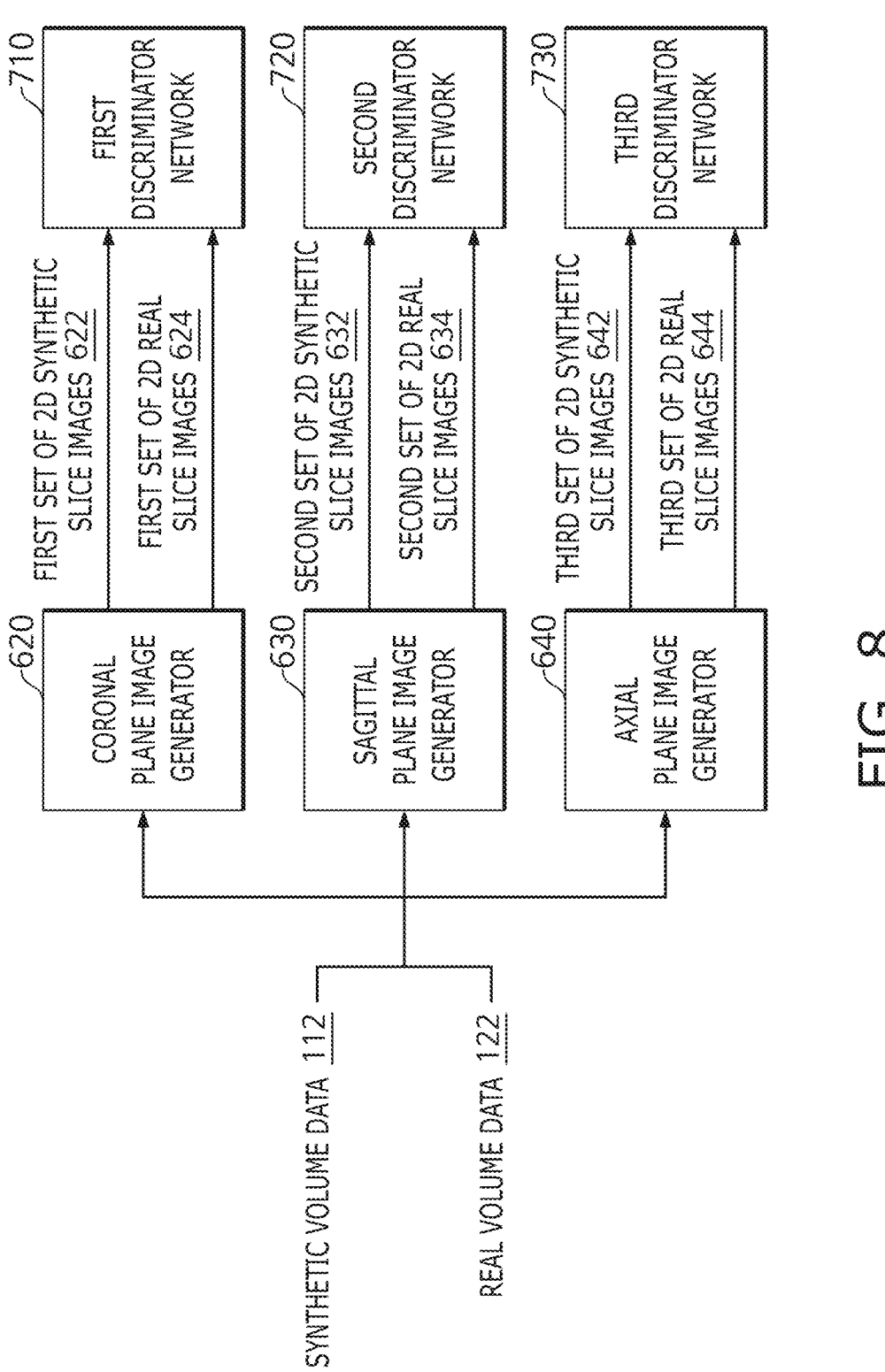
FIG. 8 is a diagram illustrating an example of generating a discrimination result for synthetic volume data and real volume data.

FIG. 8 is a diagram illustrating an example of generating a discrimination result for the synthetic volume data 112 and the real volume data 122. The coronal plane image generator 620 may receive the synthetic volume data 112 and generate a first set of 2D synthetic slice images 622 by projecting the received synthetic volume data 112 in the coronal planes. In addition, the coronal plane image generator 620 may receive the real volume data 122 and generate a first set of 2D real slice images 624 by projecting the received real volume data 122 in the coronal planes. The first discriminator network 710 may randomly receive images included in the generated first set of 2D slice images 622 and 624, and generate a discrimination result as to whether each received image is real or fake. The generated discrimination result may be utilized to update the generator network, the discriminator network, etc.

The sagittal plane image generator 630 may receive the synthetic volume data 112 and generate a second set of 2D synthetic slice images 632 by projecting the received synthetic volume data 112 in the sagittal planes. In addition, the sagittal plane image generator 630 may receive the real volume data 122 and generate a second set of 2D real slice images 634 by projecting the received real volume data 122 in the sagittal planes. The second discriminator network 720 may randomly receive images included in the generated second set of 2D slice images 632 and 634, and generate a discrimination result as to whether each received image is real or fake. The generated discrimination result may be utilized to update the generator network and the discriminator network.

The axial plane image generator 640 may receive the synthetic volume data 112 and generate a third set of 2D synthetic slice images 642 by projecting the received synthetic volume data 112 in the axial planes. In addition, the axial plane image generator 640 may receive the real volume data 122 and generate a third set of 2D real slice images 644 by projecting the received real volume data 122 in axial planes. The third discriminator network 730 may randomly receive images included in the generated third set of 2D slice images 642 and 644, and generate a discrimination result as to whether each received image is real or fake. The generated discrimination result may be utilized to update the generator network and the discriminator network.

As described above, by generating a plurality of 2D slice images by projecting the synthetic volume data from various angles and viewpoints and updating the generator network and discriminator network based on the discrimination results as to whether the plurality of 2D slice images discriminated by the plurality of discriminator networks corresponding to each angle and viewpoint are real or fake, it is possible to train a generative model to generate undistorted and consistent medical volume data.

Figure 9:
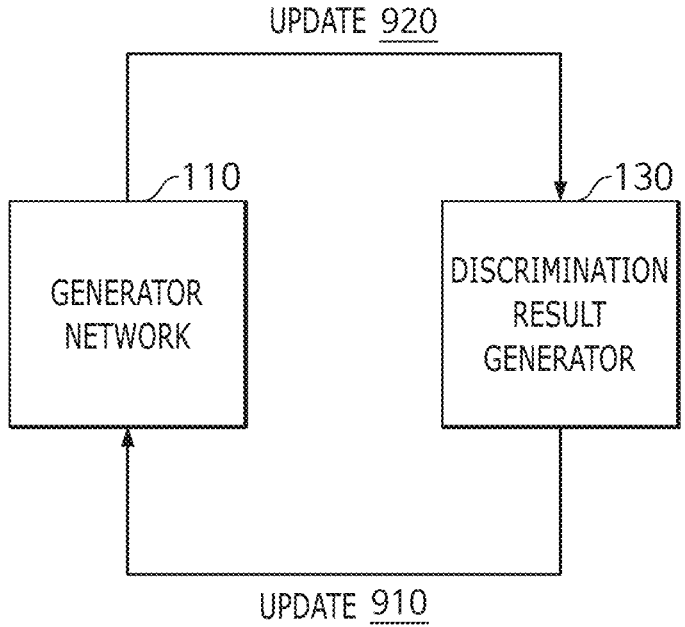
FIG. 9 is a diagram illustrating an example of updating a medical volume data generative model and system.

FIG. 9 is a diagram illustrating an example of updating a medical volume data generative model and system. The generator network 110 included in the medical volume data generative model and system and the plurality of discriminator networks included in the discrimination result generator 130 may be alternately updated. For example, the process of updating the parameters of the discrimination result generator 130 while maintaining the parameters of the generator network 110 fixed, and then updating the parameters of the generator network 110 while maintaining the parameters of the discrimination result generator 130 fixed, may be repeated.

The generator network 110 may be updated based on the discrimination result generated by the discrimination result generator 130, at S910. For example, the generator network 110 may be updated and trained with the feedbacks of the discrimination result of the discrimination result generator 130 to generate synthetic volume data that is discriminated by the discriminator network of the discrimination result generator to be the real data.

The plurality of discriminator networks of the discrimination result generator 130 may be updated based on the updated generator network, at S920. For example, a discrimination result for the synthetic volume data generated using the updated generator network may be generated, and a loss generated by comparing the generated discrimination result with the ground truth data may be computed. The discriminator network of the discrimination result generator 130 may be trained to generate an accurate discrimination result based on the calculated loss. As a loss function for computing the loss, a binary cross entropy (BCE) loss function, a softmax loss function, a bernoulli distribution loss function, etc. may be used, and it may be regressed to a value between 0 and 1 using mean squared error (MSE).

As described above, by repeating the process of alternately updating the generator network and the plurality of discriminator networks, the performance of the medical volume data generative model and system can be improved.

FIG. 10 is a flowchart illustrating an example of a method 1000 for training a medical image generative model. The method 1000 may be performed by one or more processors of the user terminal or the information processing system. Alternatively, the operations of the method 1000 may be performed separately by one or more processors of the user terminal and one or more processors of the information processing system.

The method 1000 may be initiated at a generator network by generating the synthetic volume data, at S1010. The generator network may be configured to generate a single 2D slice image, generate a 2D slice image sequence, or generate synthetic volume data, and when the generator network is configured to generate a single 2D slice image, it is possible to generate synthetic volume data by merging the 2D slice images generated by the generator network.

The processor may receive real volume data, at S1020. The processor may generate a plurality of 2D images based on the synthetic volume data and the real volume data, at S1030. The processor may generate a plurality of 2D synthetic slice images based on the synthetic volume data, and generate a plurality of 2D real slice images based on the real volume data. In this case, a plurality of 2D synthetic slice images and a plurality of 2D real slice images may be generated at the same location in each volume data.

As another example, the processor may generate a first set of 2D synthetic slice images by projecting the synthetic volume data in the coronal planes, generate a second set of 2D synthetic slice images by projecting the synthetic volume data in the sagittal planes, and generate a third set of 2D synthetic slice images by projecting the synthetic volume data in the axial planes. In addition, the processor may generate a first set of 2D real slice images by projecting the real volume data in the coronal planes, generate a second set of 2D real slice images by projecting the real volume data in the sagittal planes, and generate a third set of 2D real slice images by projecting the real volume data in the axial planes.

The processor may discriminate whether each of the plurality of 2D images generated by using the plurality of discriminator networks is real or fake, at S1040. The plurality of discriminator networks may include a first discriminator network, a second discriminator network, and a third discriminator network. In this case, the first discriminator network may discriminate whether the 2D images by projecting in the coronal planes are real or fake, the second discriminator network may discriminate whether the 2D images by projecting in the sagittal planes are real or fake, and the third discriminator network may discriminate whether the 2D images by projecting in the axial planes are real or fake.

As another example, the plurality of discriminator networks may include the first discriminator network and the second discriminator network. In this case, the first discriminator network may discriminate whether the 2D images parallel to the first planes are real or fake, and the second discriminator network may discriminate whether the 2D images parallel to the second planes are real or fake. In addition, the first surface and the second surface may be orthogonal to each other.

The processor may update the generator network based on the discrimination results of the plurality of discriminator networks, at S1050. Finally, the processor may update the plurality of discriminator networks based on the updated generator network, at S1060.

The flowchart illustrated in FIG. 10 and the above description are merely examples, and may be implemented differently in some other examples. For example, in some examples, the order of respective steps may be changed, some steps may be repeatedly performed, some steps may be omitted, or some steps may be added.

The method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, etc. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depending on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, etc. The instructions may be executable by one or more processors, and may cause the processor(s) to perform certain aspects of the functions described in the present disclosure.

When implemented in software, the techniques may be stored on a computer-readable medium as one or more instructions or codes, or may be transmitted through a computer-readable medium. The computer-readable media include both the computer storage media and the communication media including any medium that facilitates the transmission of a computer program from one place to another. The storage media may also be any available media that may be accessed by a computer. By way of non-limiting example, such a computer-readable medium may include RAM, ROM, EEPROM, CD-ROM or other optical disk storage, magnetic disk storage or other magnetic storage devices, or any other media that can be used to transmit or store desired program code in the form of instructions or data structures and can be accessed by a computer. In addition, any connection is properly referred to as a computer-readable medium.

For example, if the software is sent from a website, server, or other remote sources using coaxial cable, fiber optic cable, twisted pair, digital subscriber line (DSL), or wireless technologies such as infrared, wireless, and microwave, the coaxial cable, the fiber optic cable, the twisted pair, the digital subscriber line, or the wireless technologies such as infrared, wireless, and microwave are included within the definition of the medium. The disks and the discs used herein include CDs, laser disks, optical disks, digital versatile discs (DVDs), floppy disks, and Blu-ray disks, where disks usually magnetically reproduce data, while discs optically reproduce data using a laser. The combinations described above should also be included within the scope of the computer-readable media.

The software module may reside in RAM memory, flash memory, ROM memory, EPROM memory, EEPROM memory, registers, hard disk, removable disk, CD-ROM, or any other form of storage medium known. An exemplary storage medium may be connected to the processor such that the processor may read or write information from or to the storage medium. Alternatively, the storage medium may be incorporated into the processor. The processor and the storage medium may exist in the ASIC. The ASIC may exist in the user terminal. Alternatively, the processor and storage medium may exist as separate components in the user terminal.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or devices, and storage may be similarly influenced across a plurality of devices. Such devices may include PCs, network servers, and portable devices.

Although the present disclosure has been described in connection with some examples herein, various modifications and changes can be made without departing from the scope of the present disclosure, which can be understood by those skilled in the art to which the present disclosure pertains. In addition, such modifications and changes should be considered within the scope of the claims appended herein.

The invention claimed is:

1. A method for training a 3D space consistent medical volume data generative model, the method being performed by one or more processors and comprising:
   receiving real volume data that comprises three-dimensional scan data of at least a portion of a human;
   generating a first plurality of 2D slice images by projecting at least a portion of the real volume data into a first plane;
   receiving, via a generator network and based on random input to the generator network, generator network output comprising synthetic volume data;
   generating, based on the synthetic volume data, a second plurality of 2D slice images by projecting the synthetic volume data in the first plane;
   selecting, based on the first plane, a first discriminator network of a plurality of discriminator networks;

providing, to the first discriminator network, input data comprising the first plurality of 2D slice images and the second plurality of 2D slice images;

receiving, from the first discriminator network, output indicating for each 2D slice image in the input data, whether the 2D slice image is real or fake; and updating, based on the output from the first discriminator network, the generator network.

2. The method according to claim 1, wherein each of the plurality of discriminator networks corresponds to a different plane.

3. The method according to claim 1, wherein the first plane comprises a coronal plane, wherein the generating the first plurality of 2D slice images comprises projecting the at least a portion of the real volume data into the coronal plane, and wherein the generating the second plurality of 2D slice images comprises projecting the synthetic volume data in the coronal plane.

4. The method according to claim 1, wherein the plurality of discriminator networks are configured such that:

the first discriminator network is configured to determine whether 2D images projected in one or more coronal planes are real or fake, a second discriminator network of the plurality of discriminator networks is configured to determine whether 2D images projected in one or more sagittal planes are real or fake, and a third discriminator network of the plurality of discriminator networks is configured to determine whether 2D images projected in one or more axial planes are real or fake.

5. The method according to claim 1, wherein the first plurality of 2D slice images are parallel to the first plane, and wherein the second plurality of 2D slice images are parallel to the first plane.

6. The method according to claim 1, wherein the generating the second plurality of 2D slice images comprise receiving as part of the generator network output, one or more of:

a single 2D slice image; or a 2D slice image sequence.

7. The method according to claim 1, further comprising:

updating, based on the output from the first discriminator network, the plurality of discriminator networks.

8. The method according to claim 1, wherein the output from the first discriminator network comprises a binary indication of whether a particular image is real or fake.

9. An apparatus comprising:

a memory; and one or more processors connected to the memory and configured to execute one or more computer-readable programs included in the memory, wherein the one or more computer-readable programs comprise instructions that when executed by the one or more processors, cause:

receiving real volume data that comprises three-dimensional scan data of at least a portion of a human;

generating a first plurality of 2D slice images by projecting at least a portion of the real volume data into a first plane;

receiving, via a generator network and based on random input to the generator network, generator network output comprising synthetic volume data;

receiving real volume data;

generating, based on the synthetic volume data, a second plurality of 2D slice images based on the synthetic volume data and the real volume data by projecting the synthetic volume data in the first plane;

selecting, based on the first plane, a first discriminator network of a plurality of discriminator networks;

providing, to the first discriminator network, input data comprising the first plurality of 2D slice images and the second plurality of 2D slice images;

receiving, from the first discriminator network, output indicating, for each 2D slice image in the input data, whether the 2D slice image is real or fake; and updating, based on the output from the first discriminator network, the generator network.

10. A system for generating medical volume data, comprising:

a generator network;

a plurality of discriminator networks; and a computing device configured to:

receive real volume data that comprises three-dimensional scan data of at least a portion of a human;

generate a first plurality of 2D slice images by projecting at least a portion of the real volume data into a first plane;

receive, from the generator network and based on random input to the generator network, generator network output comprising synthetic volume data;

generate, based on the synthetic volume data, a second plurality of 2D slice images by projecting the synthetic volume data in the first plane;

select, based on the first plane, a first discriminator network of the plurality of discriminator networks;

provide, to the first discriminator network, input data comprising the first plurality of 2D slice images and the second plurality of 2D slice images;

receive, from the first discriminator network, output indicating, for each 2D slice image in the input data, whether the 2D slice image is real or fake; and update, based on the output from the first discriminator network, the generator network.

11. The apparatus according to claim 9, wherein each of the plurality of discriminator networks corresponds to a different plane.

12. The apparatus according to claim 9, wherein the first plane comprises a coronal plane, wherein the instructions, when executed by the one or more processors, cause the generating the first plurality of 2D slice images by causing projecting of the at least a portion of the real volume data into the coronal plane, and wherein the instructions, when executed by the one or more processors, cause the generating the second plurality of 2D slice images by causing projecting of the synthetic volume data in the coronal plane.

13. The apparatus according to claim 9, wherein the plurality of discriminator networks are configured such that:

the first discriminator network is configured to determine whether 2D images projected in one or more coronal planes are real or fake, a second discriminator network of the plurality of discriminator networks is configured to determine whether 2D images projected in one or more sagittal planes are real or fake, and a third discriminator network of the plurality of discriminator networks is configured to determine whether 2D images projected in one or more axial planes are real or fake.

14. The apparatus according to claim 9, wherein the first plurality of 2D slice images are parallel to the first plane, and wherein the second plurality of 2D slice images are parallel to the first plane.

15. The apparatus according to claim 9, wherein the instructions, when executed by the one or more processors, cause the generating the second plurality of 2D slice images by causing receiving, as part of the generator network output, one or more of:

a single 2D slice image; or a 2D slice image sequence.

16. The apparatus according to claim 9, wherein the instructions, when executed by the one or more processors, further cause:

updating, based on the output from the first discriminator network, the plurality of discriminator networks.

17. The system according to claim 10, wherein each of the plurality of discriminator networks corresponds to a different plane.

18. The system according to claim 10, wherein the first plane comprises a coronal plane, wherein the computing device is configured to generate the first plurality of 2D slice images by projecting of the at least a portion of the real volume data into the coronal plane, and wherein the computing device is configured to generate the second plurality of 2D slice images by projecting of the synthetic volume data in the coronal plane.

19. The system according to claim 10, wherein the plurality of discriminator networks are configured such that:

the first discriminator network is configured to determine whether 2D images projected in one or more coronal planes are real or fake, a second discriminator network of the plurality of discriminator networks is configured to determine whether 2D images projected in one or more sagittal planes are real or fake, and a third discriminator network of the plurality of discriminator networks is configured to determine whether 2D images projected in one or more axial planes are real or fake.

20. The system according to claim 10, wherein the first plurality of 2D slice images are parallel to the first plane, and wherein the second plurality of 2D slice images are parallel to the first plane.

* * * * *